United States Patent [19]

Miyatuka et al.

[11] 4,025,338
[45] May 24, 1977

[54] METHOD FOR MACHINING METAL WORK

[75] Inventors: Hajime Miyatuka; Satoru Honjo, both of Asaka, Japan

[73] Assignee: Fuji Photo Film Co., Ltd., Minami-ashigara, Japan

[22] Filed: Sept. 2, 1975

[21] Appl. No.: 609,648

[30] Foreign Application Priority Data

Aug. 30, 1974  Japan .................... 49-98886

[52] U.S. Cl. .................. 96/1 R; 90/62 R; 219/69 M
[51] Int. Cl.² .................................... G03G 8/00
[58] Field of Search ............. 96/1 R, 1 PS, 1 PE, 96/1 M; 90/62 R; 219/69 R, 69 M, 69 D

[56] References Cited

UNITED STATES PATENTS

| 732,154 | 6/1903 | Barr | 90/62 R X |
|---|---|---|---|
| 3,061,708 | 10/1962 | Pfan | 219/69 D |
| 3,588,430 | 6/1971 | Appel et al. | 219/69 M |
| 3,648,013 | 3/1972 | Stayner et al. | 219/69 D |
| 3,669,859 | 6/1972 | Merrill | 96/1 R X |
| 3,813,267 | 5/1974 | Honjo et al. | 96/1 R X |

FOREIGN PATENTS OR APPLICATIONS

| 4,537,395 | 11/1970 | Japan | 96/1 R |
|---|---|---|---|
| 1,070,785 | 6/1967 | United Kingdom | 96/1 R |
| 1,010,309 | 11/1965 | United Kingdom | 96/1 R |

Primary Examiner—David Klein
Assistant Examiner—Judson R. Hightower
Attorney, Agent, or Firm—Sughrue, Rothwell, Mion, Zinn and Macpeak

[57] ABSTRACT

A process for machining metal work comprising forming a marked-off image from an image-forming material on a surface of a metal work or on a recording layer provided on the surface of the metal work and subsequently machining the metal work by machine cutting and/or oil immersion electrospark machining on the basis of the marked-off image, and including applying a protective resin layer on the image-bearing surface of the metal work prior to any metal machining, the resin layer comprising a mixture of nitrocellulose and a methacrylic polymer in a weight ratio ranging from about 80:20 to 40:60 of the nitrocellulose to the methacrylic polymer and not hindering the viewing of the image, and the methacrylic polymer mainly comprising methyl methacrylate and having a glass transition temperature of higher than about 85° C.

6 Claims, 8 Drawing Figures

U.S. Patent   May 24, 1977   4,025,338
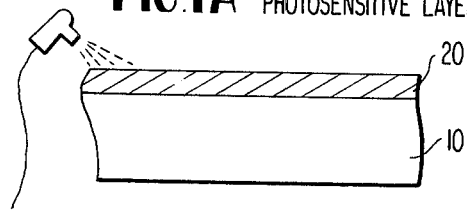
FIG.1A APPLICATION OF A PHOTOSENSITIVE LAYER
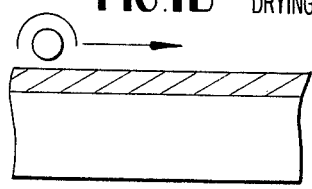
FIG.1B DRYING
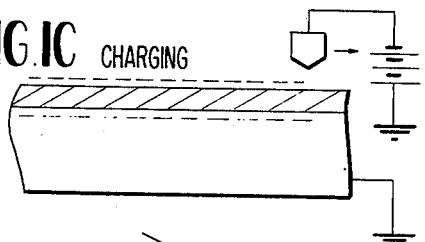
FIG.1C CHARGING
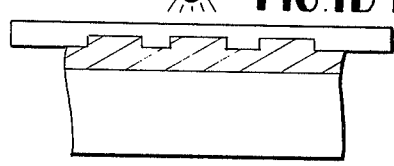
FIG.1D EXPOSURE
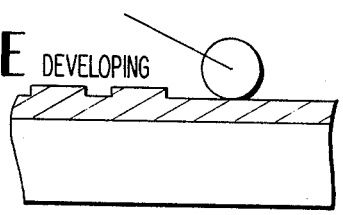
FIG.1E DEVELOPING
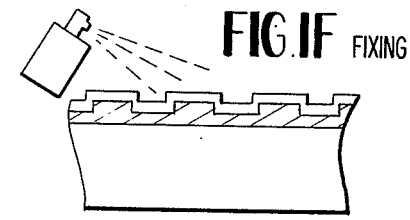
FIG.1F FIXING
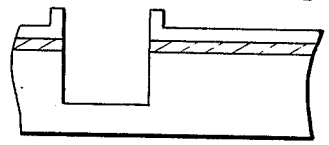
FIG.1G MACHINING
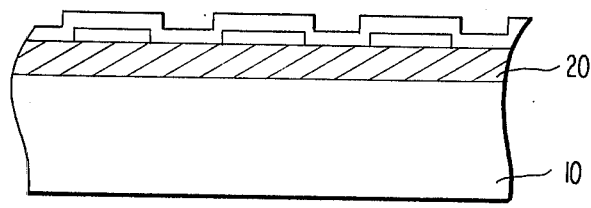
FIG.2

METHOD FOR MACHINING METAL WORK

BACKGROUND OF THE INVENTION

1. Field of the Invention

This invention relates to a method for machining metal work, and more particularly to an improvement in a method for machining metal work which have thereon an image marked off by a photographic process.

2. Description of the Prior Art

A photographic marking-off process usng a diazo photosensitive layer has been in use for a considerable period of time in the aircraft manufacturing industry. Furthermore, with the advancement of electrophotographic technology, the application of electrophotography to marking-off process has become widespread in the shipbuilding industry in the last ten years.

When fine and highly precise marking lines are required, it becomes necessary to form a photosensitive layer on the surface of the work to be marked off. Suitable materials for the layer include a diazo photosensitive layer, photosensitive resin layers and electrophotographic sensitie layers. Moreover, it has become possible for the photosensitive material to be left only at the marked portion and to be removed at the non-image portion by effectively utilizing recently developed processes such as particle migration recording methods (as disclosed, for example, in U.S. Pat. No. 3,520,681, Japanese Patent Publication Nos. 10796/1968 and 13513/1968, and British Pat. No. 1,152,365), photoelectrophoretic recording methods (as disclosed, for instance, in U.S. Pat. No. 3,384,565, Japanese Patent Publication No. 21781/1968 and British Pat. No. 1,124,625) and manifold recording methods (as disclosed, for instance, in U.S. Pat. No. 3,512,968), thus increasing the desirability from the standpoint of subsequent fabrication. Also, when high precision is not of primary importance, a method according to Japanese Patent Publication No. 122195/1972 can be suitably utilized.

Conventionally, a layout requiring high precision has been scribed using a marking-off pin.

The advantages of mechanically marked-off images include resistance against erasure during the subsequent machining operation and the ease in applying punches at crucial points of the grooves which form the images, the advantages usually outweighing the disadvantage that the images are sometimes difficult to view due to reflection.

In contrast, photographically marked-off images are generally formed by addition of a certain material, resulting in image-bearing surfaces which either protrude or are substantially flat. While good visibility to the naked eye is obtained, photographically produced images can easily be removed from the image-bearing members or from the photosensitive layers thereof, or may in other instances simply disintegrate during the subsequent fabrication. The images may also deteriorate due to the high temperature produced during the machining of hard image-bearing members or under the influence of solvents such as kerosene used for oil-immersion electrospark machining, making it necessary to specifically protect the images in these cases.

A bath for electrospark machining usually contains minute metal powder particles and other floating dust which are electrostatically charged and tend to contaminate the background of the recording layer.

A possible method to protect a recorded image is to provide a protective layer coating which does not hinder seeing the image. Conventionally used protective layers, however, either tend to soften upon heating or have highly insulating properties, which mean dust particles in the electrospark bath are electrostatically attracted to the layer.

SUMMARY OF THE INVENTION

This invention relates to a method for machining a metal work, which method usees a protective layer which is free from the above described shortcomings.

More particularly, this invention provides a process wherein a marked-off image is formed from an image-forming material on a surface of a metal to be worked or on a recording layer provided on a metal to be worked and subsequently the metal to be worked in machined on the basis of this marked-off image. This method for machining a metal work comprises applying a resin layer on the image-bearing surface prior to any metal working steps, the resin layer being a mixture of nitrocellulose and a polymer (the mixing weight ratio being in the range of about 80:20 to about 40:60, preferably 70:30 to 45:55) and not hindering the reading of the image, the polymer mainly comprising methyl methacrylate and having a glass transition temperature of higher than about 85° C, the method being characterized in that the subsequent metal working steps include a machine cutting step and/or an oil-immersion electrospark machining step.

BRIEF DESCRIPTION OF THE DRAWINGS

FIG. 1 is a schematic view illustrating the individual steps of the method according to the invention.

FIG. 2 is a view showing, in enlarged cross section, a metal member on which all steps of the invention have been conducted.

DETAILED DESCRIPTION OF THE INVENTION

The invention is now described with reference to FIG. 1, showing by way of example a case wherein an image is formed by an electrophotographic method, in order to facilitate an understanding of the technical background of the invention.

A photoconductive insulating layer 20 is formed on a metal work 10. A typical composition of the layer can be a mixture of ZnO and a heat resistant resin binder. A mixture comprising a finely-divided photoconductor such as CdS, $TiO_2$, CdSSe, $PbCrO_4$, Se, etc. and a resinous binder such as a polyalkyl (metha) acrylate, a polyvinyl chloride-polyvinyl acetate copolymer, an alkyl acrylate copolymer, polystyrene, a styrene-butadiene copolymer, an epoxide resin, an alkyl resin, a silicone resin, a urethane resin, etc. as described, in for example, U.S. Pat. No. 1,121,006 can also be used. Further, a composition based on an organic photoconductor as described in, for example, U.S. Pat. Nos. 3,121,007, 3,122,435, 3,127,266, 3,130,046, 3,131,060, 3,139,338 3,139,339, 3,140,946, 3,141,770, etc. can be employed in the present invention. The layer is dried and subsequently electrically charged in the dark by means of a corona charger as described in U.S. Pat. Nos. 2,836,725, 2,856,533, 2,879,395. An exposure is made by contacting this layer closely with a precisely drawn original image or by projecting such thereon, and the exposed image is developed by means of, for instance, a liquid developer as described with U.S. Pat. Nos. 2,907,674, 2,877,133, 3,076,722 etc. Developers with various compositions and properties have thus for been disclosed in the prior art and the material which forms the image can generally be classified as a pigmented resin, which in a typical composition comprises a pigment such as carbon and phthalocyanine, and a resin such as a copolymer of ethyl acrylate and methyl methacrylate. The image formed using such a composition is not resistant to the attack of kerosene nor to the heat produced during cutting, and therefore a protective layer must be provided over the image.

Although not shown, an image marked off using a mainfold recording method comprises lines, in this case directly on a metal member, of a pigmented resin or wax which has poor oil and heat resistance, thus also requiring protection.

A suitable method to provide the image with oil and heat resistance would be the application of a layer of a thermosetting resin. A difficulty involved with the method above is that thermosetting must not take place before application of the resin and that the steps involved are complicated and time-consuming. On the other hand, a thermoplastic resin which is suitable for the purpose must exhibit high adhesion to the substrate or to the recording layer and have quite a high glass transition temperature. Furthermore, a resin must resist smudging by minute electrostatically charged particles in the electospark bath, while facilitating simple removal of any dust once deposited thereon and ensuring a good visibility of the marked-off image at all times. Referring to FIGS. 1A to 1G showing in cross section a metal member which has been machine cut, it will be clear that the recording layer, the image and the protective layer are subjected to extremely rough treatment such as a high temperature and incandescent metal chips bombard adjacent areas. The protective layer must fulfill all of the above-described requirements, yet not being removed therefrom under such circumstances.

It has been found experimentally that the protective layer according to the invention, which is thermoplastic and is very easy to apply and dry, meets all of the above-described requirements. Use of nitrocellulose alone is dangerous and the quantity of use thereof should be minimized as much as possible. On the other hand, an excessive amount of methyl methacrylate causes the layer to have too high an insulating property, posing difficulties in removal of dust and in spray-application of the coating. Also, a noticeable reduction in the adhesion between the layer and the substrate occurs. The reduction in adhesion poses a special problem where a protective layer is adhesively applied directly on a metal substrate. Accordingly, it has been found that the nitrocellulose content should at least be about 40 percent by weight. Likewise, a nitrocellulose proportion in excess of about 80 percent by weight causes the protective layer to be negatively charged through friction, thereby causing the layer to attract dust (which for the most part is positively charged) in the electrospark bath. With a proportion of nitrocellulose at about 70 percent by weight, the polarity of the electric charges acquired by the layer through friction inclines rapidly toward the positive, and at 60 percent, the polarity of the layer becomes substantially equal to that of a 100 percent polymethyl methacrylate layer. The methyl methacrylate component of the layer can include a small amount of copolymers. The resulting copolymer, however, should not decrease the compatibility of the methylmethacrylate polymer with the nitrocellulose component and also should have a glass transition temperature from about 85° to 115° C, preferably about 90° to 105° C. When the glass transition temperature is below about 85° C, the heat resistance of the protective layer becomes insufficient, that is, the protective layer becomes adhesive during machining. Suitable components for copolymerization include hydroxymethyl methacrylate, hydroxyethyl acrylate, glycidyl methacrylate, vinyl acetate, ethyl methacrylate, acrylic acid, methacrylic acid, and styrene. With respect to the methyl methacrylate component and the combination thereof, reference should be made to E. H. Riddle *Monomeric Acrylic Esters* Reinhold Pub. Corp. (1954) and J. Brandrup and E. H. Immergut, *Polymer Hand Book* Interscience Publications II-141 - II-289 (1967). Suitable compositions of the methylmethacrylate component which can be employed can be determined by considering the solubility and the compatibility thereof with the nitrocellulose component, but the resulting copolymer should not have a glass transition temperature below about 85° C. In general, the glass transition (Tg) of a two component type copolymer is governed by the following relationship, $$\frac{1}{T_g + 273} = \frac{W_1}{T_{g1} + 273} + \frac{W_2}{T_{g2} + 273}$$

wherein $W_1$ and $W_2$ each represents the content by weight of each component having a glass transition temperature of ($T_{g1}$ °C) and ($T_{g2}$ °C), respectively. The copolymer used in the invention, in general, can have a degree of copolymerization of the component with methyl methacrylate of up to about 20% due to the compatibility of the copolymer with the nitrocellulose component.

Nitrocellulose which is suitable for the protective layer has a degree of nitration of 11% to 12% by weight. The most practical method for forming the protective layer is spray-coating, but other suitable methods which can be used include roll-coating, dip-coating and whirl-coating. Suitable solvents which can be used to prepare the coating composition for the protective layer include ketones such as acetone, methyl ethyl ketone, methyl isobutyl ketone, etc., ethers and ether-esters such as ethyl glycol monoethyl ether, ethylene glycol monomethyl ether, ethylene glycol monoethyl ether acetate, etc., aromatic hydrocarbons such as toluene, xylene, etc., alcohols such as ethanol, butanol etc., or any combination thereof, which gives a suitable drying rate. A suitable concentration of the coating composition, for instance, can range from about 5 to 25% by weight/volume, preferably about 10 to 20% in the case of spray-coating.

A suitable thickness of the protective layer should range from about 2 to 30 $\mu$, and more desirably between 4 and 15 $\mu$.

The following examples are given to illustrate the present invention in greater detail. Unless otherwise indicated, all parts, percentages and the like are by weight.

EXAMPLE 1

EPM photosensitive paint (sold by Fuji Photo Film Co.) was applied on the surface of JIS (Japanese Industrial Standard) SKD-61 hot working die steel block (dimensions: length 500mm × width 200mm × thickness 300mm), thereby to form an electrophotographic photosensitive layer. The layer had the following composition when dried.

|  | percent by volume |
|---|---|
| ZnO | 50 |
| Acrylic Resin (degree of polymerization : about 100) | 25 |
| Epoxy Ester of Dehydrated Castor Oil Fatty Acid ** (oil length : 40 percent) | 25 |
| Colbalt Naphthenate * | |

* % by volume based on the epoxy ester
** Reaction product of epoxy resin prepared by condensation of bisphenol A and epechlorohydrin, and dehydrated castor oil fatty acid.

The acrylic resin used above was a copolymer comprising 60 parts by weight of n-butyl methacrylate, 15 parts by weight of ethyl methacrylate, 22 parts by weight of styrene, and 3 parts by weight of acrylic acid.

The electrophotographic layer was electrically charged by corona charging in the dark, image-wise exposed with an incandescent lamp in close contact with a precisely drawn original image and developed with a liquid developer to form a marked-off image. The liquid developer comprised a copolymer including 5 parts by weight of acrylic acid and 95 parts by weight of lauryl acrylate, with carbon black as a major non-soluble (image forming) component. After the carrier component of the developing liquid had evaporated off, a protective layer having the following composition was applied in a thickness of 8 $\mu$ on a dry basis.

|  | parts by weight |
|---|---|
| Nitrocellulose (nitration index : 11.8 percent by weight ; viscosity : 3 to 6 seconds as a 25 percent by weight solution) | 75 |
| Polymethyl Methacrylate (degree of polymerization : 150) | 25 |
| Methyl Ethyl Ketone | 100 |
| Ethyl Acetate | 120 |
| Buthyl Acetate | 100 |
| Butanol | 40 |
| Cellosolve Acetate | 40 |
| Toluene | 100 |

* A solution of 25% nitrocellulose, 18.7% ethanol, 15.0% ethyl acetate, and 41.3% toluene (by weight).

The photosensitive layer became quite hard when left in an atmosphere of 40° C for one whole day, due to the action of the cobalt naphthenate.

Cutting was then carried out using a tool comprising a super hard end mill (double blades, Diatitanit UTI-20R, manufactured by Mitsubishi Kinzoku, corresponding to JIS M-20) at a cutting rate of 47 m/minute. The cut was 10 mm and the feed was 0.2 mm per blade. The damage inflicted on the photosensitive and protective layers was limited to areas within 0.3 mm from the worked edges.

In another example, a metal member (JIS SKD-61 hot working die steel block) with the same protective layer was immersed in kerosene for 15 hours, the member was subsequently removed and the kerosene thereon was wiped off. The surface of the member was then immediately scratch tested with a pencil tester having a hardness of 3H in accordance with JIS DO202 (standards relating to the coating of automobile parts).

The protective layer was not damaged at all in the above test. Furthermore, any dirt on the layer surface was easily removed by wiping the layer surface with a cloth, and the increase in surface contamination due to the immersion was neglibible.

EXAMPLE 2

Naphthol Red B (Code 20 -7575 manufactured by American Cyanamide) was dissolved in ethylenediamine, extra pure, and the resultant solution was filtered. The Naphthol Red B was precipitated using isopropanol, centrifugally separated, washed first with isopropanol and then with dimethylformamide, and dried at a temperature of 40° C. 3 parts of Naphthol Red B which was purfied as described above was added to 45 parts of naphtha, and the mixture was subsequently mixed with grinding for 4 hours in a ball mill.

2.5 parts of low molecular weight paraffin (Paraflint RG. produced by Moore & Munger, New York City) was added to 3 parts of polyethylene (DYLT, produced by Union Carbide Corporation), 0.5 parts of vinyl acetate-ethylene copolymer (Elvax 420 produced by E.I. duPont de Nemours Inc.), 2.5 parts of a modified polystyrene (Piccotex 100, produced by Pennsylvania Industrial Chemical Co.) and 15 parts of Sohio Odorless Solvent 3440 (produced by Standard Oil Co. of Ohio), the mixture was heated to dissolve the resins therein and then the mixture was subsequently added to above-described pigment dispersion. The entire composition was ground for 18 hours in a ball mill and then added to 45 parts of isopropanol and mixed with grinding for 15 minutes. The resultant mixture was applied using a bar-coating method on a polyethylene terephthalate film having a thickness of 25 $\mu$. The applied mixture formed a layer having a weight of 1.6 g/m$^2$ on a dry basis. The coated film was used, after drying, as a donor in a manifold recording process described below.

The donor formed as above was thinly sprayed on a recording layer thereof using Sohio Odorless Solvent 3440 to activate the layer, which was subsequently brought into face-to-face contact with a surface of the same steel block as in Example 1. A NESA glass sheet was placed on the donor sheet in such a manner that the NESA surface contacted the back surface of the donor sheet. A negative original size image was placed on the NESA glass and an exposure was made thereon using a tungsten light source, and a DC potential of 5,000 volts was simultaneously imposed between the NESA glass and the steel block. When the donor sheet was separated from the others without releasing the potential, a red positive image was formed on the die steel block. 60 parts of nitrocellulose and 40 parts of methyl methacrylate-vinyl acetate copolymer (monomer weight ratio 90:10) were then dissolved in the same solvent as used for the coating composition in Example 1. The resultant protective layer composition was spray-coated on the steel block to form a protective layer of a thickness of 15 $\mu$ on a dry basis.

When the steel block with the protective layer was subjected to the same machining steps as described in Example 1, the damage inflicted was limited to the areas 0.4 mm from the worked edges.

EXAMPLE 3

80 parts of photoconductive ZnO, 20 parts of rutile structure TiO$_2$ and 20 parts of a styrene modified alkyd resin varnish (Styrezol 4250 manufactured by Japan Reichhold : 50 percent non-volatile components) were added to 50 parts of toluene-ethyl acetate mixture (volume ratio 60:40) and mixed with grinding. To the mixture was added 5 parts of a 75 percent solution of a polyisocyanate hardener (condensation product between 1mol of trimethylolpropane and 3 mols of tolylene diisocyanate) in ethyl acetate immediately before coating on the same die steel block as in Example 1 to form a layer. The dried thickness of the coated layer was 20 μ. After sufficient drying, a marked-off image was obtained as in Example 1 by charging, image-wise exposure and development with a liquid developer as described in Example 1. The toner image after development was mainly composed of graft carbon having graft chains comprising 95 parts of lauryl acrylate and 5 parts of acrylic acid. The weight ratio of the graft chains to the carbon was 50:50. This image disappeared upon contact with kerosene by dissolving in the kerosene. In order to protect the image, a protective layer was spray-applied on the image, the layer comprising 50 parts by weight of nitrocellulose and 50 parts by weight of methyl methacrylate-methacrylic acid copolymer (monomer weight ratio 95:5). The thickness of the layer ranged between 7 and 9 μ on a dry basis. The protective layer produced as above showed satisfactory results when exposed to metal cutting and electrospark machining steps as in Example 1.

EXAMPLE 4

10 parts of copper phthalocyanine and 90 parts of glycerin ester of rosin were placed in a ball mill and mixed with 70 parts of an equal-volume mixture of butyl acetate and toluene. The resultant dispersion was coated on an aluminum block so that the coated layer had a dry thickness of 5 μ.

After positively electrically charging the block by corona discharge in a dark place, a negative image was projected thereon. The block was then immersed in xylene for two seconds and then placed in an isopraffin-type solvent, thereby to obtain a clear positive image.

After evaporating the solvent, the same protective layer coating composition as in Example 1 was coated on the image and dried. The produced image was capable of resisting the subsequent machine cutting step successfully, as in Example 1. The image bearing block was then immersed in a kerosene bath for the electrospark machining. Again, the block did not attract any dirt, and also any stains or dust were easily removed by wiping the block with a cloth.

COMPARATIVE EXAMPLE

The protective layer in Example 1 was replaced by a layer of the following composition, the same procedures in the example otherwise being repeated.

|  | parts |
|---|---|
| Epoxy Ester of Dehydrated Castor Oil Fatty Acid (as described in Example 1) | 50 |
| Cobalt Naphthenate | 0.5 |
| Toluene | 200 |

This protective layer coating composition and not develop sufficient solvent and heat resistance unless the layer was heated after coating, e.g., for about 20 hours at about 60° C. After being left at a temperature of 50° C for a whole day, the protective layer composition proved satisfactory protection in the mechanical cutting process. When left in a kerosene bath for 15 hours and electrospark machining was conducted, however, the protective layer surface became difficult to clean. After wiping with a cloth, the protective layer coating surface was still substantially uniformly stained, making it difficult to discern the image and showing the inferiority of this protective layer in comparison with any of the protective layer compositions in the above-described Examples.

While the invention has been described in detail and with reference to specific embodiments thereof, it will be apparent to one skilled in the art that various changes and modifications can be made therein without departing from the spirit and scope thereof.

What is claimed is:

1. In an electrophotographic process for machining a metal work comprising forming a marked-off image from an image-forming material on a surface of a recording layer comprising an electrophotographic sensitive layer comprising a photoconductive powder in a binder resin provided on the surface of the metal work and subsequently machining the metal work on the basis of the marked-off image; the improvement comprising applying a protective resin layer over the image-bearing surface of the metal work prior to any metal machining, the resin layer comprising a mixture of nitrocellulose and a methacrylic polymer in a weight ratio ranging from about 80:20 to 40:60 of the nitrocellulose to the methacrylic polymer and not hindering the visibility of the image, and the methacrylic polymer mainly comprising methylmethacrylate, wherein the degree of copolymerization of any other component with methyl methacrylate is up to about 20%, and having a glass transition temperature of about 85° C. to 115° C., wherein said protective resin layer has a thickness ranging from about 2 to 30 microns, on a dry basis.

2. The process of claim 1, wherein said methacrylic polymer mainly comprises methyl methacrylate and a monomer copolymerizable with said methyl methacrylate.

3. The process of claim 2, wherein said monomer copolymerizable with said methyl methacrylate is hydroxymethyl methacrylate, hydroxyethyl acrylate, glycidyl methacrylate, vinyl acetate, ethyl methacrylate, acrylic acid, methacrylic acid or styrene.

4. The process of claim 1, wherein said subsequent machining of said metal work is by machine cutting.

5. The process of claim 1, wherein said subsequent machining of said metal work is by oil immersion electrospark machining.

6. The process of claim 1, wherein said subsequent machining of said metal work is by machine cutting and oil immersion electrospark machining.

* * * * *